United States Patent
Fukutani et al.

(10) Patent No.: US 6,208,381 B1
(45) Date of Patent: Mar. 27, 2001

(54) CONVERTIBLE CONNECTOR ARRANGEMENT ADAPTABLE FOR VIDEO CAMERA

(75) Inventors: Takahiro Fukutani; Hiroyoshi Hamashima, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/825,887

(22) Filed: Apr. 2, 1997

(30) Foreign Application Priority Data

Apr. 4, 1996 (JP) .................................................. 8-082205

(51) Int. Cl.[7] .................................................. H04N 5/225
(52) U.S. Cl. ........................ 348/375; 348/373; 439/131; 439/172
(58) Field of Search .................................... 348/373, 374, 348/375; 358/906, 909.1; 439/263, 544, 581, 776, 218, 170, 171, 172, 188, 131

(56) References Cited

U.S. PATENT DOCUMENTS

| | | | |
|---|---|---|---|
| 2,288,241 | * 6/1942 | Holcomb | 439/400 |
| 4,957,831 | * 9/1990 | Merdith et al. | 429/121 |
| 5,306,174 | 4/1994 | Kiga | 439/341 |
| 5,535,093 | * 7/1996 | Noguchi et al. | 361/686 |
| 5,545,046 | * 8/1996 | Masuda et al. | 439/142 |
| 5,833,482 | * 11/1998 | Buchter | 439/288 |

* cited by examiner

*Primary Examiner*—Wendy Garber
*Assistant Examiner*—Mitchell White
(74) *Attorney, Agent, or Firm*—Limbach & Limbach LLP (57) ABSTRACT

A convertible connector arrangement for a video camera includes first and second connector portions. One of the connectors is configured for analog signals and the other for digital signals. The first and second connectors are joined along one side thereof to be pivotally mounted by a mounting member in an installation body, or frame. The mounting member and the joined connectors are configured such that the two connectors are disposed at a predetermined angle in relation to one another. According to pivotal movement of the mounting member, one of the two connectors may be operably disposed in an opening provided in the installation body. The other connection is thus inoperably stored within the video camera or VTR body. A locking mechanism is further provided to assure secure mounting and operability. A video camera utilizing the convertible connector arrangement may thus be selectably converted for analog or digital operation in a secure and efficient manner.

22 Claims, 7 Drawing Sheets

CONVERTIBLE CONNECTOR ARRANGEMENT ADAPTABLE FOR VIDEO CAMERA

BACKGROUND OF THE INVENTION

1. Field of the Invention

The present invention relates to a convertible connector arrangement for a video camera. Specifically, the present invention relates to a convertible connector by which a video camera or the like may be selectably converted for analog or digital operation.

2. Description of the Related Art

Generally, video cameras may be connected to a VTR (video tape recorder) component for autonomous operation. However, recently there is increasingly a requirement for the use of both analog and digital types of VTR. Accomodation of both signal formats by separate camera units becomes unfeasibly expensive. Adaptive connectors have been used to interface a camera body, including lens, viewfinder and other imaging components. But these are generally cumbersome and difficult to install or connect to preinstalled analog or digital interface components.

Thus, it has been required to economically provide a connector arrangement for a video camera which facilitates easy conversion for interface with either analog or digital signal processing components.

SUMMARY OF THE INVENTION

Thus, it is an object of the present invention to overcome the drawbacks of the related art.

It is a further object of the invention to provide a connector arrangement for a video camera which facilitates easy conversion for interfacing with either analog or digital signal processing components.

According to one aspect of the invention, there is provided a convertible connector arrangement, comprising, an installation body movably mounting a first connector portion having a first mounting surface and a second connector portion having a second mounting surface, the first and second connector portions being joined at the first and second mounting surfaces thereof; support means connected to the installation body disposed to support the installation body and the first and second connector portions, the support means being pivotably moveable in first and second directions; and the installation body allowing one of the first and second connectors to be disposed in an operable position according to pivotal movement of the support means.

Also, according to another aspect of the invention, there is provided a convertible connector arrangement for a video camera, comprising, a first camera component mounting an installation body movably retaining a first connector having a first mounting surface and a second connector having a second mounting surface; the first and second connectors respectively allowing connectivity with components other than the first camera component and, the first and second connectors being joined at the first and second mounting surfaces thereof; support means connected to the installation body disposed to support the installation body and the first and second connector portions, the support means being pivotably movable in first and second directions; and the installation body allowing one of the first and second connectors to be disposed in an operable position on the first camera component according to pivotal movement of the support means.

DESCRIPTION OF THE PREFERRED EMBODIMENT

Figure 1:
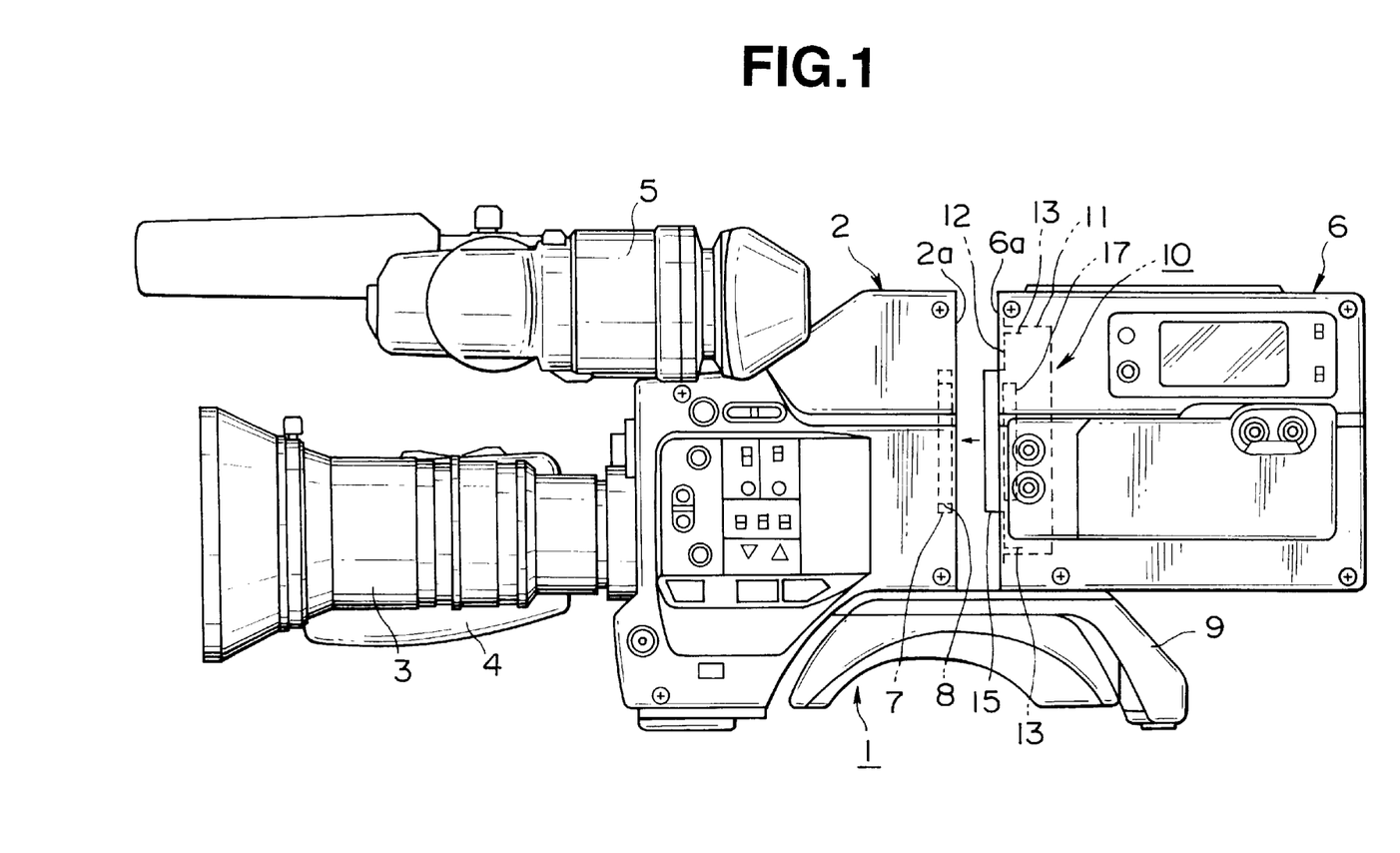
FIG. 1 is a side view of a video camera having a convertible connector arrangement according to the invention installed therein.
Figure 2:
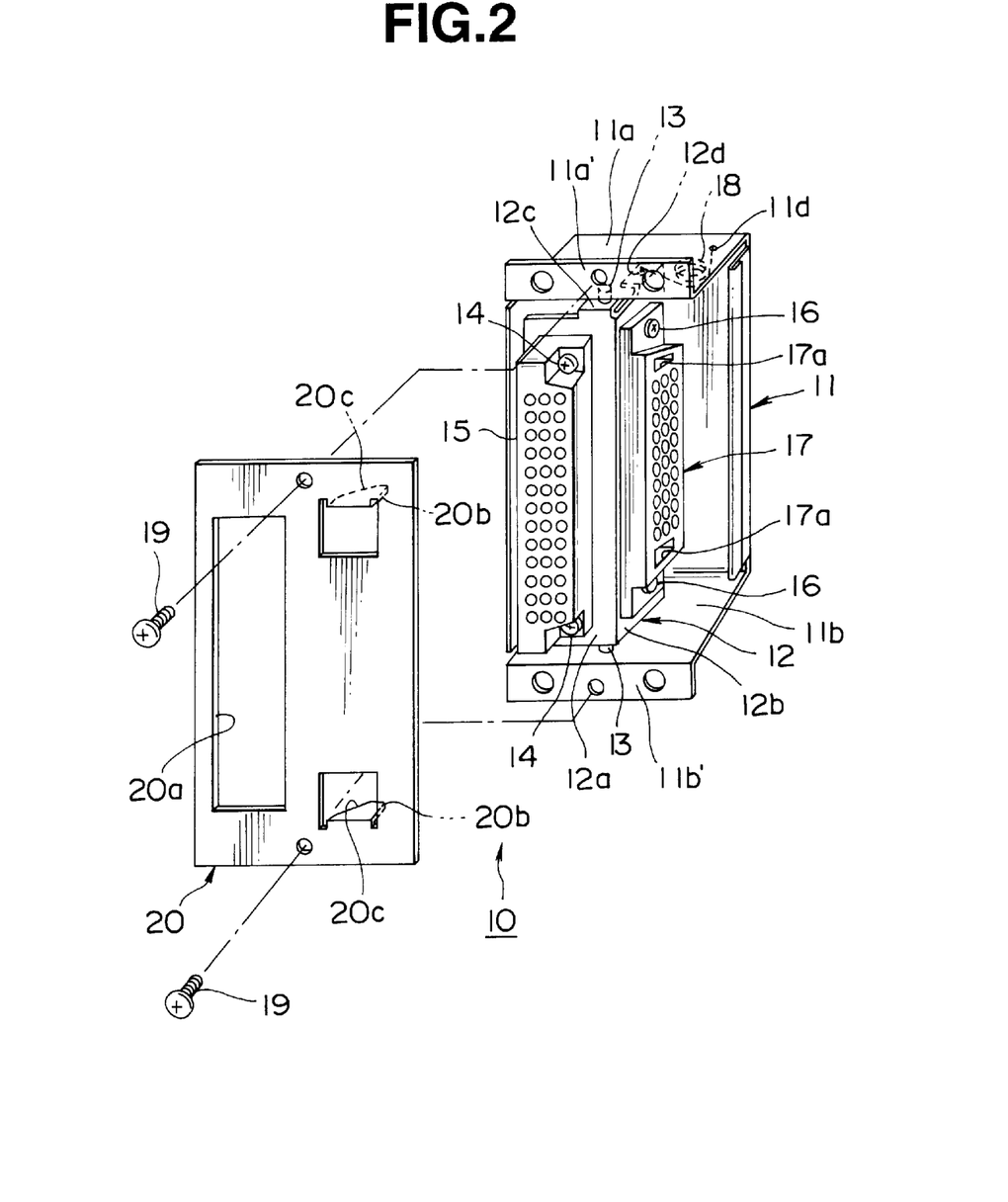
FIG. 2 is an exploded perspective view of a first preferred embodiment of the convertible connector arrangement of the invention disposed to be operable in an analog mode.

Hereinbelow, a preferred embodiment of the invention will be explained in detail with reference to the drawings. Referring to FIG. 1, a video camera 1 into which a convertible connector arrangement according to a first preferred embodiment of the invention has been installed, is shown. As may be seen in the drawing, the video camera 1 is comprised of various components, including a view finder 5, a lens 3, clip portion 4, shoulder rest 9, camera body component 2 and a VTR component 6.

Figure 3A:
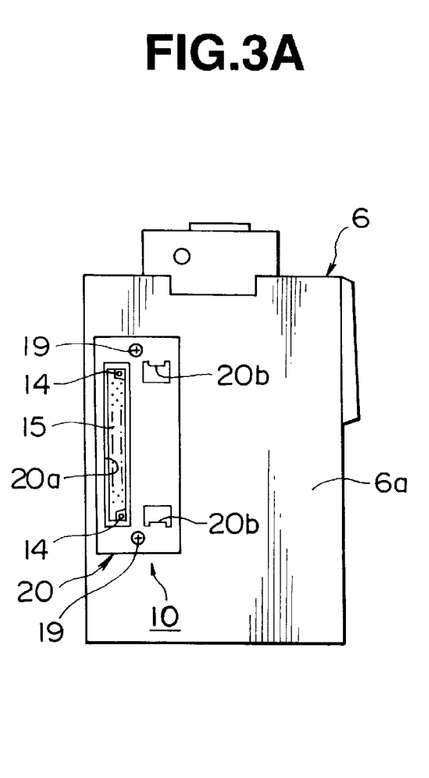
FIG. 3A is a front view of a VTR (video tape recorder) component of a video camera into which the convertible connector arrangement of the invention is installed in the analog mode of FIG. 2.
Figure 3B:
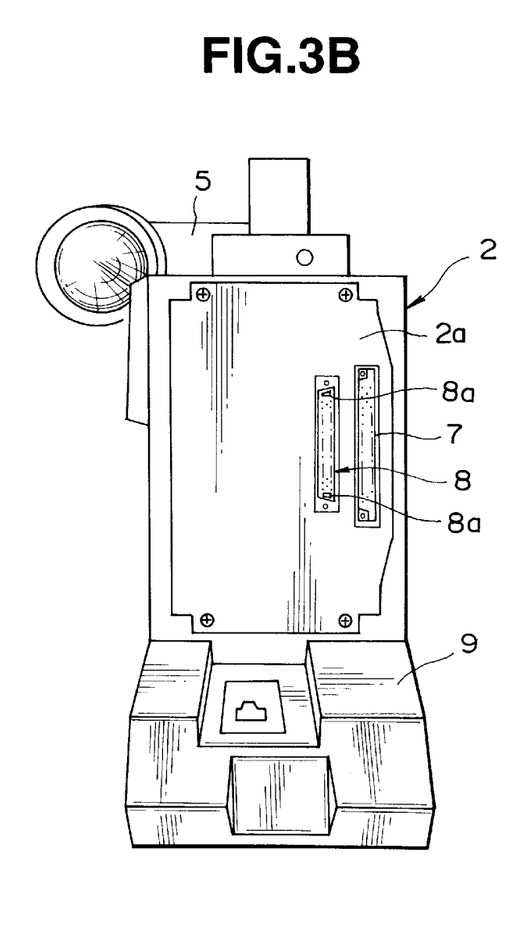
FIG. 3B is a rear view of a camera body component of a video camera connectable with the VTR component of FIG. 3A in the analog mode.
Figure 4:
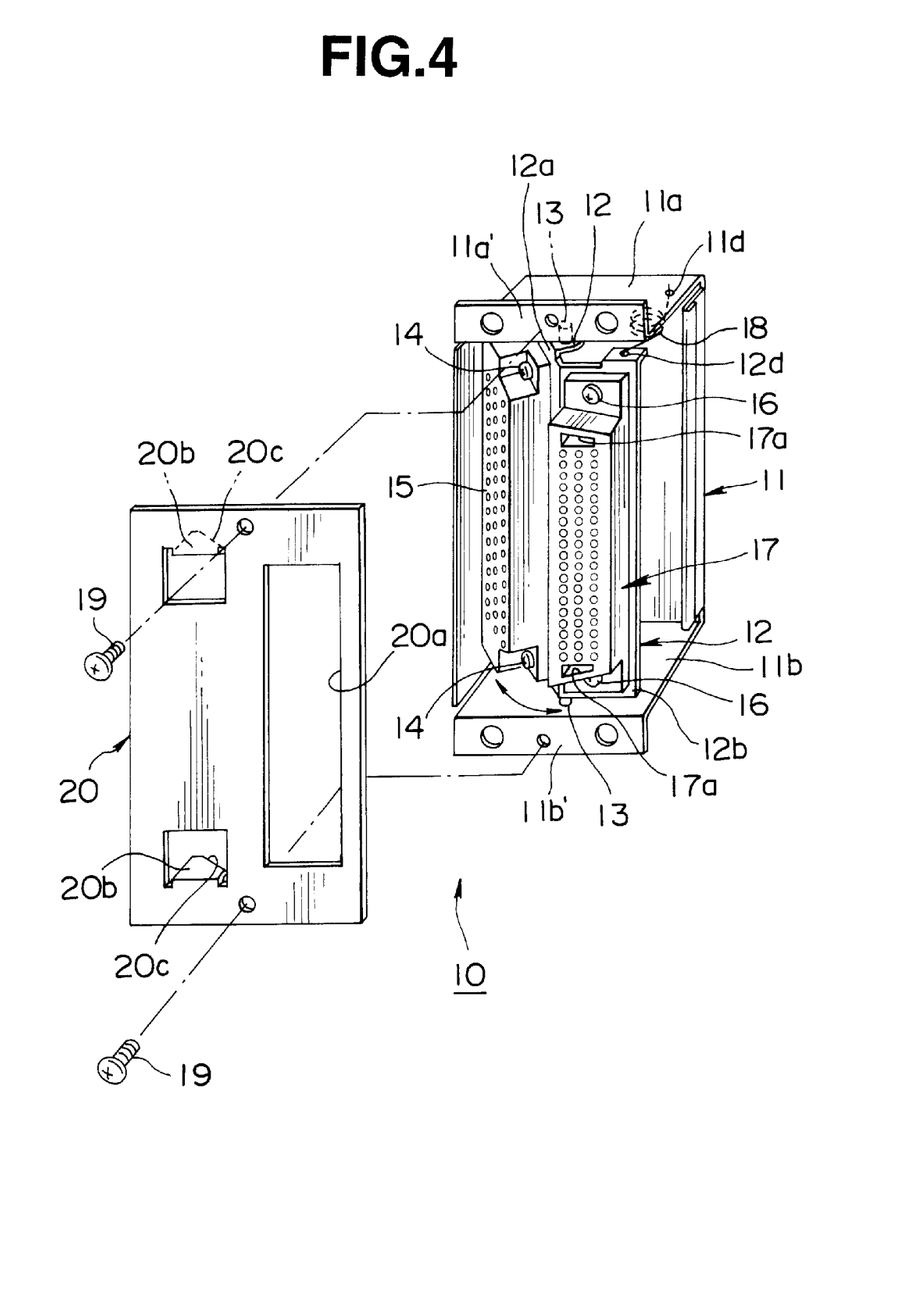
FIG. 4 is an exploded perspective view of the convertible connector arrangement of the invention disposed to be operable in a digital mode.

A rear side 2a of the camera body component 2 engages a front side 6a of the VTR component 6. The VTR component 6 can thus be removably mounted on the camera body component 2. Referring now to FIG. 3A and FIG. 3B, a front side of the VTR component 6 and a rear side of the camera body component 2 are respectively shown. As may be seen from the drawings, engaging connector portions are provided for allowing interfacing between the camera body component 2 and the VTR component 6.

The lens 3 may effect imaging via a CCD (not shown) or the like. The camera is enabled to output video image data in analog or digital modes. As may be appreciated in FIGS. 3B and 5B, the rear side 2a of the camera body component 2 may be interfaced to the VTR component 6 at the front side 6a of the VTR component 6 (removably mountable on the camera body component 2) via a first analog connector 7 and a second digital connector 8. According to the present embodiment the analog and digital connectors 7 and 8 are disposed in vertically elongate configurations arranged in parallel on the rear side 2a of the camera body component 2.

Figure 7:
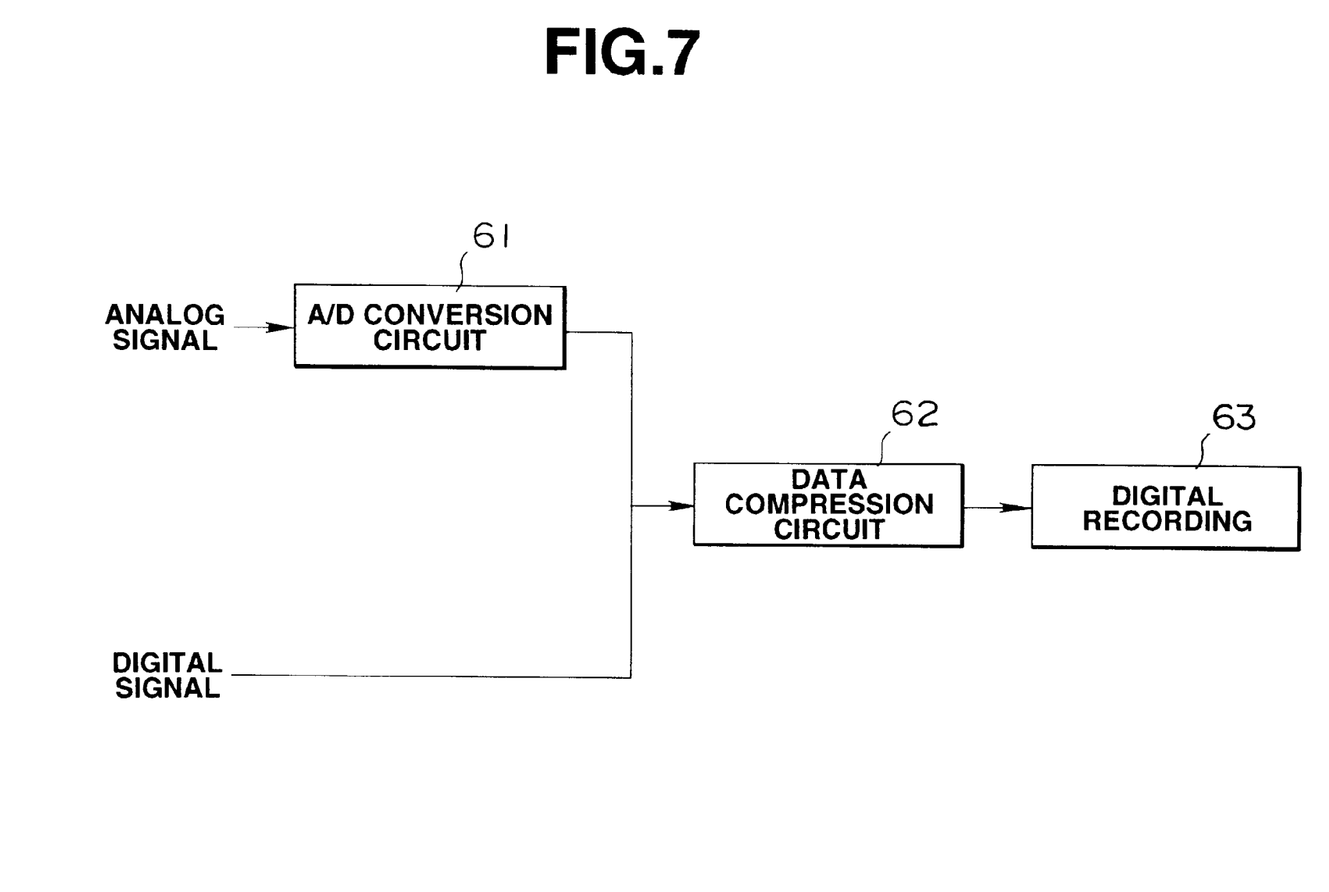
FIG. 7 is a block diagram showing the signal path of analog and digital video signals via the convertible connector arrangement of the invention.

Referring to FIG. 7 a signal path of signal outputs from the digital video camera 1 to the VTR component 6 may be understood. As may be seen in the drawings, the analog output signal is input to an A/D converter 61 for conversion to digital data. The digital data is subsequently input to a digital compression circuit and digital processing portion to be encoded on magnetic tape provided as a digital tape cassette or the like (not shown) loaded into a tape recorder portion of the VTR component 6. On the other hand, digital output from the camera body component 2, such as output via the digital connector 8, is input directly to the digital compression circuit 62 and digital processing portion 63 for data encoding onto magnetic tape.

Figure 5A:
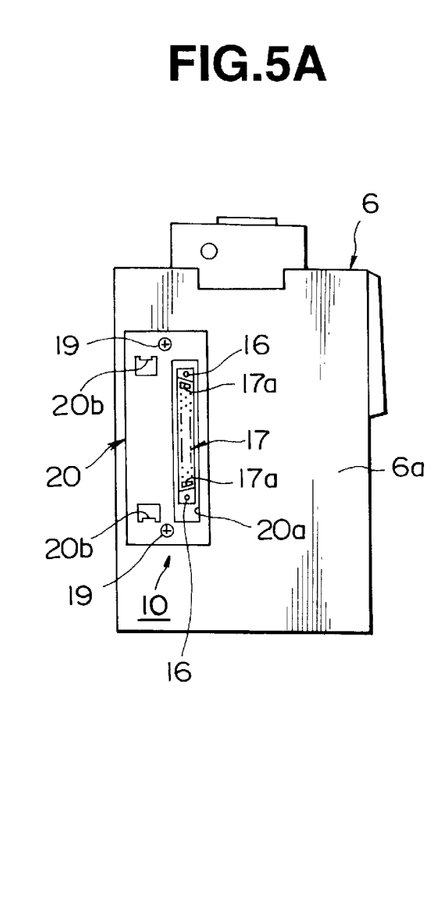
FIG. 5A is a front view of a VTR (video tape recorder) component of a video camera into which the convertible connector arrangement of the invention is installed in the digital mode of FIG. 4.
Figure 5B:
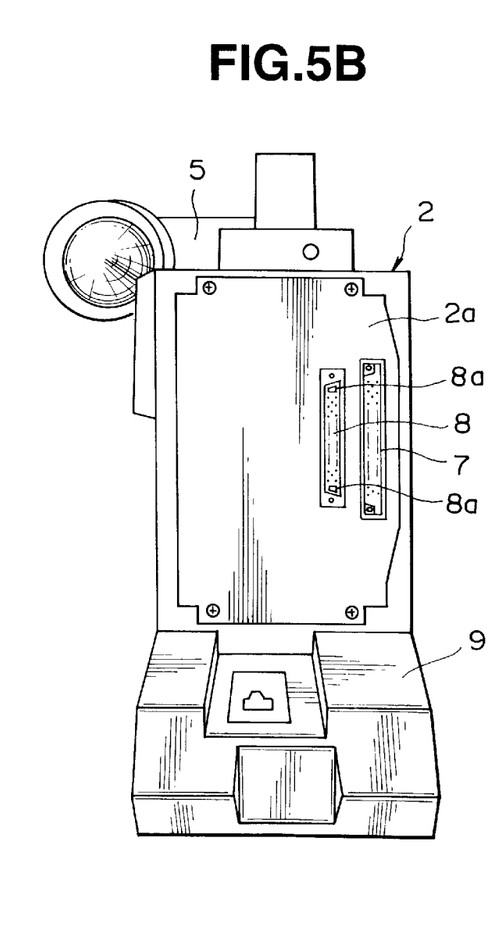
FIG. 5B is a rear view of a camera body component of a video camera connectable with the VTR component of FIG. 5A in the digital mode.

Now, referring to FIGS. 3A and 5A, the installation of the convertible connector arrangement may be seen. FIG. 3A illustrates an analog input mode of the VTR component 6 in which the convertible connector arrangement 10 is mounted to facilitate access to the analog connector 7. The convertible connector arrangement 10 is mounted via a mounting plate 20 having an elongate connector frame opening 20a formed therethrough on one side and upper and lower cut-outs defining retaining tabs 20b, 20b which terminate in tapered stop members 20c, 20c on the other side thereof. The connectors 7 and 8 are mounted via a box-like installation body 11 having upper and lower sides 11a, 11b and upper and lower mounting taps 11a' and 11b', and a movement limiting stopper 11d is provided on the lower surface of the upper side 11a.

The installation body retains a pivotal mounting member 12 which is substantially V-shaped, comprises a first mounting plate 12b mounting the analog connector 7, and a second mounting plate 12a mounting the digital connector 8. The planes of the first and second plates 12b and 12a are joined in an angular relation to each other and movably connected to the installation body 11 via pivotal connections 13, 13 at upper and lower sides thereof. The mounting member 12 includes side portion 12b and upper tab 12d projected perpendicularly back from the first mounting plate 12b. The upper tab engages a coil spring 18 attached to the stopper 11d for positionally biasing the positioning of the pivotal mounting member 12.

The mounting plate 20 and the upper and lower mounting taps 11a', 11b' of the installation body are provided with corresponding openings to be attached via a screw 19, or the like.

The connectors 7, 8 include connective faces 17, 15 respectively and are respectively mounted via screws 16,16, and 14, 14. As may be seen the analog connector 7 further includes locking recesses 17a, 17a at upper and lower sides thereof.

According to this configuration, conversion of the VTR component 6 for receiving image data via the analog connector 7 or the digital connector 8 may be easily facilitated, as may be appreciated from FIG. 6.

Figure 6A:
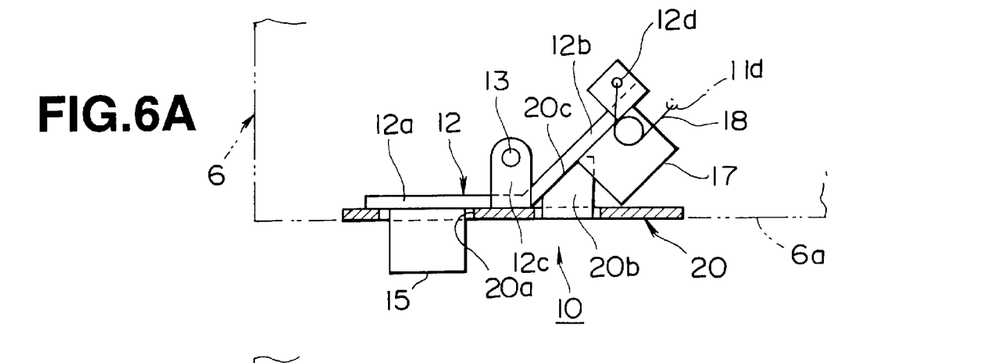
FIG. 6 is a cross sectional view of a portion of a video camera showing an installation and mounting configuration of the convertible connector arrangement of the invention.

As may be seen, the mounting plate 20 is removable from the front surface 6a of the VTR component 6 by loosening retaining screws (not shown) or other means of removable attachment. For example, the mounting plate may be attached as in FIG. 6A, whereat the digital connector 8 is accessible at an operable position as seen in FIG. 6A. For switching connector access to the analog connector 7, the mounting plate is removed from the front side 6a of the VTR component 6 as in FIG. 6B and the analog connector is moved to the operable position by the biasing force of the coil spring 18.

Figure 6B:
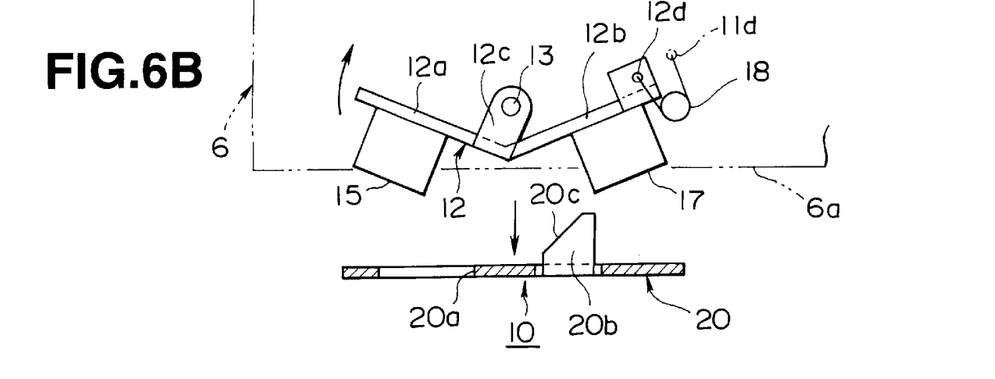
Figure 6C:
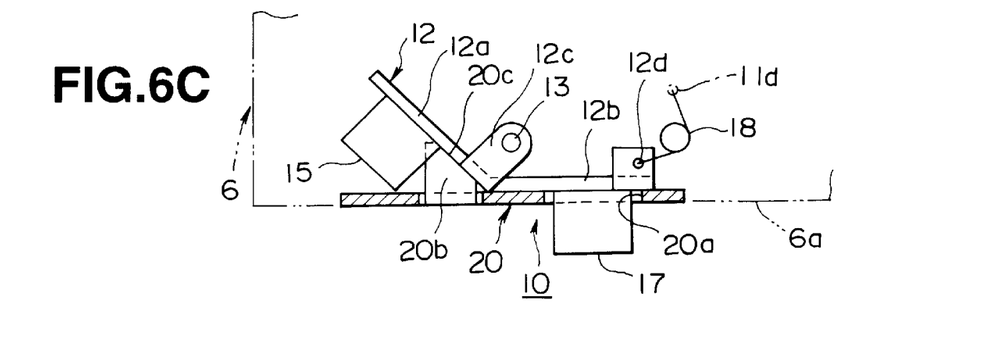

Then, referring to FIG. 6C the mounting plate 20 is repositioned in an inverted manner. This inverse orientation of the mounting plate 20 aligns the connector access opening 20a with the connective surface 17 of the analog connector 7 and orients the tapered stop portions 12c of the retaining tabs 12b to support the second plate 12a along a front surface 12c thereof. The plate 20 is then reattached to the front side 6a of the VTR component 6 and the connector conversion operation is complete.

Conversely, when conversion is made from the analog connector 7 to the digital connector 8, the mounting plate is again removed from the front side 6a of the VTR component 6 as in FIG. 6B.

Then, as seen in FIG. 6A the mounting plate 20 is again inverted and respositioned. This orientation of the mounting plate 20 aligns the connector access opening 20a with the connective surface 15 of the digital connector 8 and orients the tapered stop portions 12c of the retaining tabs 12b to support the positioning of the pivotable mounting member 12 via insertion into the locking recesses 17a, 17a in the face 17 of the analog connector 7.

The plate 20 is then reattached to the front side 6a of the VTR component 6, at which time the tapered stoppers 12c of the retaining tabs 12b engage the locking recesses 17a and adjust the pivotal postion of the mounting member 12 against the biasing force of the coil spring 18 and the connector conversion operation is complete.

Thus, according to the present invention as described herein above, there is provided an easily utilized convertible connector arrangement for a video camera having novel advantages as set forth above.

It will be noted that, although the preferred embodiment is set forth in terms of a convertible connector arrangement for a video camera, the present invention may be embodied in various different ways to interface among various analog and digital components without departing from the principle of the invention as herein set forth.

The present invention in not limited only to the description as herein disclosed but may be modified and embodied in other ways without departing from the scope or inventive concept of the invention as set forth above.

What is claimed is:

1. A convertible connector arrangement, comprising:
   an installation body having a first retaining portion movably retaining a first connector portion having a first mounting surface and a second retaining portion movably retaining a second connector portion having a second mounting surface, said first and second connector portions being joined at said first and second mounting surfaces thereof;
   support means connected to said installation body disposed to support said installation body and said first and second connector portions, said support means being pivotably moveable in first and second directions; and
   said installation body allowing one of said first and second connector portions to be disposed in an operable position according to pivotal movement of said support means.

2. A convertible connector arrangement, comprising:
   an installation body having a first retaining portion movably retaining a first connector portion having a first mounting surface and a second retaining portion movably retaining a second connector portion having a second mounting surface, said first and second connector portions being joined at said first and second mounting surfaces thereof;
   support means connected to said installation body disposed so as to support said installation body and said first and second connector portions, said support means being pivotably moveable in first and second directions; and said installation body allowing one of said first and second connector portions to be disposed in an operable position according to pivotal movement of said support means, wherein said support means is pivotable in a first direction and a second direction opposite said first direction wherein pivotal movement in said first direction disposes said first connector portion in said operable position and pivotal movement in said second direction disposes said second connector portion in said operable position.

3. A convertible connector arrangement as set forth in claim 2, wherein said installation body retains said first and second connector portions at a predetermined angular relation to each other.

4. A convertible connector arrangement, comprising:

an installation body having a first retaining portion movably retaining a first connector portion having a first mounting surface and a second retaining portion movably retaining a second connector portion having a second mounting surface, said first and second connector portions being joined at said first and second mounting surfaces thereof;

support means connected to said installation body disposed so as to support said installation body and said first and second connector portions, said support means being pivotably moveable in first and second directions; and said installation body allowing one of said first and second connectors to be disposed in an operable position according to pivotal movement of said support means, further including a cover portion removably engageable so as to cover a connect surface of either of said first and second connector portions in said operable position.

5. A convertible connector arrangement as set forth in claim 4, wherein said cover portion engages for covering said first connector portion when disposed in a first covering position and engages to cover said second connector portion when disposed at a second covering position inverse to said first covering position.

6. A convertible connector arrangement as set forth in claim 4, further including attaching means engaging a retaining portion of said second connector portion when said first connector portion is disposed in said operable position.

7. A convertible connector arrangement as set forth in claim 6, wherein an attachment member of said attaching means has a tapered configuration.

8. A convertible connector arrangement as set forth in claim 6, wherein said cover portion and said locking means are integrally formed.

9. A convertible connector arrangement, comprising:

an installation body having a first retaining portion movably retaining a first connector portion having a first mounting surface and a second retaining portion movably retaining a second connector portion having a second mounting surface said first and second connector portions being joined at said first and second mounting surfaces thereof;

support means connected to said installation body disposed so as to support said installation body and said first and second connector portions, said support means being pivotably moveable in first and second directions; and said installation body allowing one of said first and second connector portions to be disposed in an operable position according to pivotal movement of said support means, further including attaching means engaging said second retaining portion of said second connector portion when said first connector portion is disposed in said operable position.

10. A convertible connector arrangement as set forth in claim 9, wherein an attachment member of said attaching means has a tapered configuration.

11. A video camera including a convertible connector arrangement, comprising:

a camera component mounting an installation body movably including first and second retaining portions retaining a first connector having a first mounting surface and a second connector having a second mounting surface, said first and second connectors being joined at said first and second mounting surfaces thereof;

support means connected to said installation body disposed so as to support said installation body and said first and second connector portions, said support means being pivotably movable in first and second directions;

said installation body allowing one of said first and second connectors to be disposed in an operable position on said first camera component according to pivotal movement of said support means.

12. A video camera including a convertible connector arrangement as set forth in claim 11, wherein said first connector is operable as an analog signal input/output interface when said first connector is in said operable position and said second connector is operable as a digital signal input/output interface when said second connector is in said operable position.

13. A video camera including a convertible connector arrangement as set forth in claim 11, wherein connection of said first camera component to signal processing components other than said first camera component is facilitated according to said first and second connectors being selectively available to be disposed in said operable position.

14. A video camera including a convertible connector arrangement as set forth in claim 11, wherein said first camera component is a recording apparatus.

15. A convertible connector assembly for selectively connecting a peripheral component with one of a first connector and a second connector of a body component, comprising:

a mounting plate adjustable to accommodate connection of said peripheral component with said body component at said selected one of said first connector and said second connector; and a pivotable mounting member having a first connective portion and a second connective portion configurable for pivotably connecting to said selected one of said first connector and said second connector, respectively.

16. The convertible connector assembly of claim 15, wherein said pivotable mounting member is pivotable to a first position wherein said first connective portion is disposed for connection with said first connector and to a second position wherein said second connective portion is disposed for connection with said second connector.

17. The convertible connector assembly of claim 16, wherein said first and second connective portions of said pivotable mounting member form an obtuse angle such that said second connective portion is indisposed for connection with said second connector when said pivotable mounting member is in said first position, and said first connective portion is indisposed for connection with said first connector when said pivotable mounting member is in said second position.

18. The convertible connector assembly of claim 15, further comprising a cover portion removably engageable to cover the unselected one of said first connector and said second connector.

19. A video camera assembly, comprising:
   a camera component;
   a video recorder component; and
   a convertible connector assembly for selectively connecting said video recorder component with one of a first connector and a second connector of said camera component, said convertible connector comprising:
   a mounting plate adjustable to accommodate connection of said video recorder component with said camera component at said selected one of said first connector and said second connector; and
   a pivotable mounting member having a first connective portion and a second connective portion configurable for pivotably connecting to said selected one of said first connector and said second connector, respectively.

20. The video camera assembly of claim 19, wherein said pivotable mounting member of said convertible connector assembly is pivotable to a first position wherein said first connective portion is disposed for connection with said first connector and to a second position wherein said second connective portion is disposed for connection with said second connector.

21. The video camera assembly of claim 20, wherein said first and second connective portions of said pivotable mounting member form an obtuse angle such that said second connective portion is indisposed for connection with said second connector when said pivotable mounting member is in said first position, and said first connective portion is indisposed for connection with said first connector when said pivotable mounting member is in said second position.

22. The video camera assembly of claim 19, wherein said convertible connector assembly further comprises a cover portion removably engageable to cover the unselected one of said first connector and said second connector.

\* \* \* \* \*